May 7, 1957  D. A. HOYT  2,791,166
TRAJECTORY RECORDING CAMERA
Filed June 28, 1955  2 Sheets-Sheet 1
Fig. 1
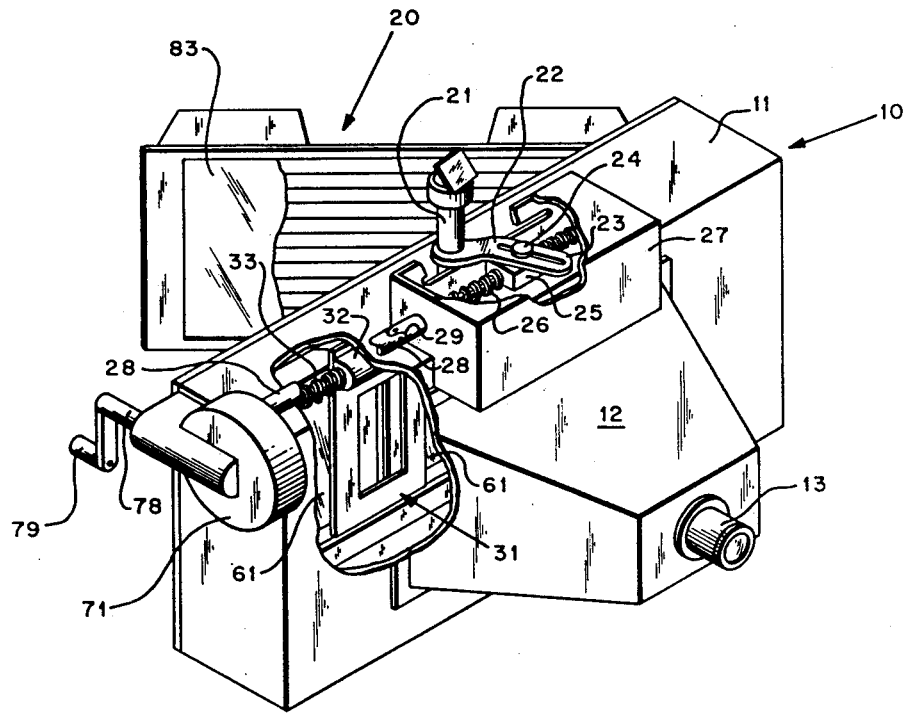
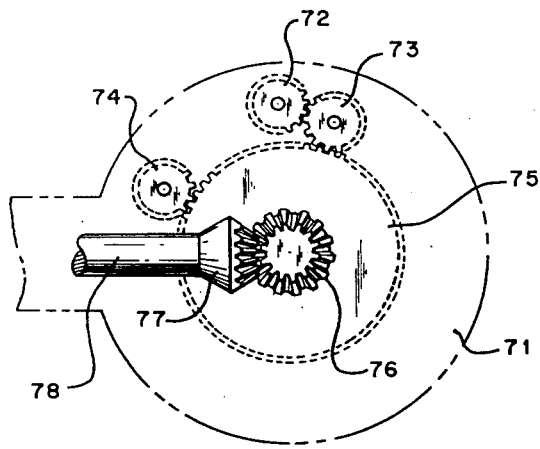
Fig. 2
INVENTOR.
DONALD A. HOYT
BY
*L. M. Smith Jr.*
ATTORNEYS May 7, 1957 D. A. HOYT 2,791,166
TRAJECTORY RECORDING CAMERA
Filed June 28, 1955 2 Sheets-Sheet 2
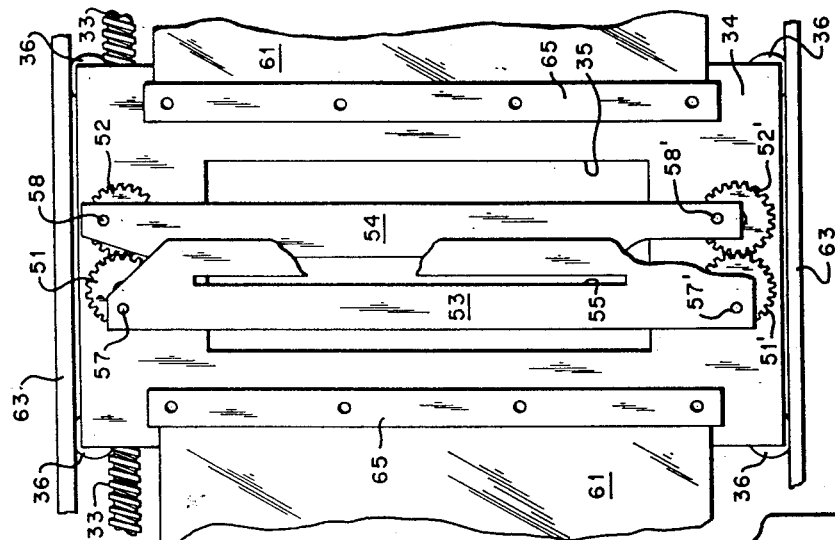
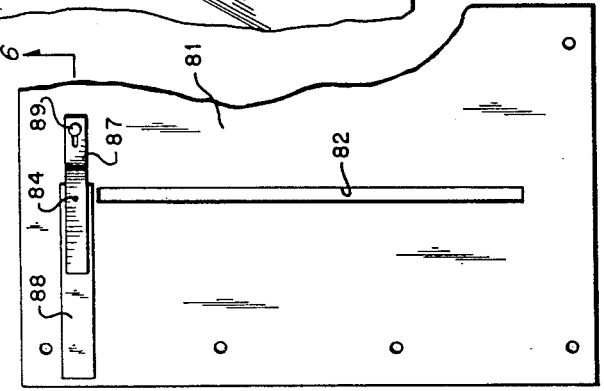
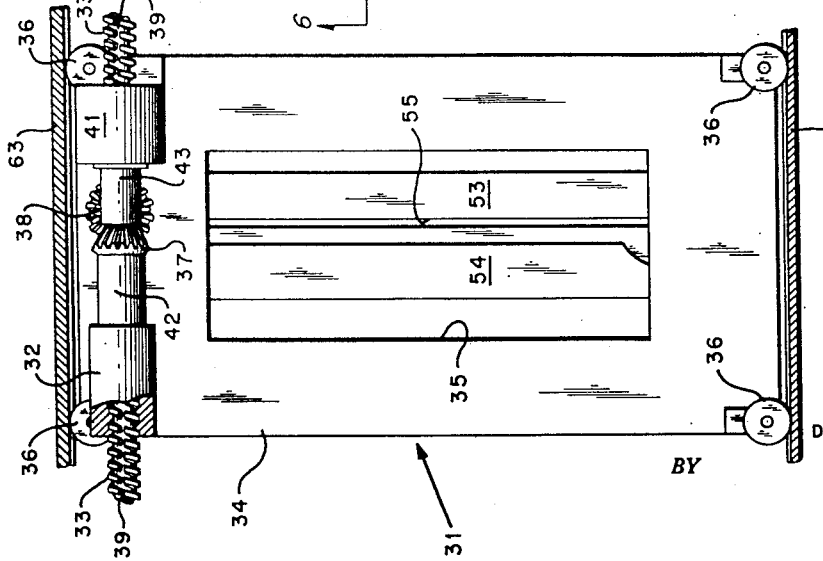
INVENTOR.
DONALD A. HOYT
BY
ATTORNEYS United States Patent Office 2,791,166
Patented May 7, 1957

2,791,166
TRAJECTORY RECORDING CAMERA

Donald A. Hoyt, Levittown, Pa., assignor to the United States of America as represented by the Secretary of the Navy Application June 28, 1955, Serial No. 518,705

4 Claims. (Cl. 95—36)

(Granted under Title 35, U. S. Code (1952), sec. 266)

The invention described herein may be manufactured and used by or for the Government of the United States of America for governmental purposes without the payment of any royalties thereon or therefor.

This invention relates to a trajectory recording camera and more particularly to a trajectory recording camera for tracking high-speed airborne objects and recording successive images of such objects to trace their trajectories. This device is particularly useful for recording the trajectories followed by objects such as missiles released from high-speed aircraft in flight, and also for recording the flight path and attitude of aircraft itself, particularly during landings and take-offs.

One previously known mechanism for this purpose is characterized by a rotary shutter mechanism which exposes a narrow strip of film substantially the width of a radius of the shutter mechanism and hence requires a relatively large and bulky housing for the shutter mechanism. The utility of this particular mechanism is further restricted due to the fact that it employs a very small negative upon which the image definition is not of sufficient quality to provide a consistent record of the instantaneous attitude of the object being photographed. Another previously developed mechanism for this purpose is characterized by a solenoid operated shutter mechanism of limited cyclic rate, so that this mechanism is not suitable for extremely high speed operation.

The present invention contemplates means for obtaining an extended sequence of vertical strip photographs, in each of which an airborne object such as an aircraft or an object dropped therefrom appears as it travels along its flight path or trajectory, thereby providing a composite view of the trajectory traveled by the object. In order to provide an adequate negative size for clear definition of the instantaneous attitude of the object, as it travels along its trajectory, the instant invention was designed to use aerial roll film 9½ inches wide which produces a negative 25½ inches long by 8½ inches wide capable of including a substantial number of mutually adjacent strip photographs each extending transversely thereof. The use of rotary disc focal plane shutters of the type previously used with film of this size would necessitate a camera height at least two and a half to three times the width of the film because of the space occupied by the shutter mechanism. Since such a configuration would be prohibitively large the camera mechanism of the instant invention incorporates an entirely new and much more compact type of shutter in order to minimize the overall dimensions of the camera assembly. In addition, the shutter mechanism of the instant invention is capable of performing at extremely high speeds.

An object of the present invention is the provision of means for effectively tracking and recording the trajectory of airborne objects.

Another object is to provide trajectory recording means capable of operating at extremely high speeds.

Still another object is the provision of a light weight compact trajectory recording camera.

A final object of this invention is to provide a trajectory recording camera with a substantially improved shutter mechanism capable of performing at extremely high speeds.

Other objects and many of the attendant advantages of this invention will be readily appreciated as the same becomes better understood by reference to the following detailed description when considered in connection with the accompanying drawings wherein:

Fig. 1 shows an isometric view, partially broken away, of a trajectory recording camera assembly comprising a preferred embodiment of the instant invention, Fig. 2 is a detailed view of the manually controlled gear train for coordinated movement of the sight assembly and the shutter assembly, Fig. 3 shows a front elevation of the shutter assembly, Fig. 4 shows a front elevation of the shutter cover, partially broken away, Fig. 5 illustrates a rear elevation, partially broken away, of the same embodiment of the shutter assembly, and Fig. 6 is a cross-sectional view, partially broken away, taken on line 6—6 of Fig. 5.

Referring next to the drawings, in which like reference numerals refer to like or corresponding parts in each of the several views, there is shown in Fig. 1 a preferred embodiment of the instant invention comprising a camera assembly generally designated by the reference numeral 10 comprising a camera body 11 consisting of a generally rectangular box, a lens cone 12 mounted thereon, a lens assembly 13 mounted upon lens cone 12, a film magazine generally designated by the reference numeral 20, demountably attached by suitable means (not shown) to the camera body 11, a target tracking sight assembly 21 rotatably mounted upon the camera body 11, a focal plane shutter assembly generally designated by reference numeral 31 mounted within the camera body 11 for movement across the focal plane, curtains 61 connected to the opposite sides of shutter assembly 31 to screen the film against exposure except through the shutter mechanism, and a manually controlled drive mechanism consisting of gear box 71 for producing coordinated movement of the sight assembly 21 and the shutter assembly 31. The sight assembly 21, which may be any suitable type, such as an aircraft gun sight, is positioned by an arm 22 extending radially therefrom having a slot 23 therethrough, which is engaged by a pin or boss 24 projecting from a block 25 threadably engaged by a rotatably mounted elongated drive screw 26. The drive screw 26 includes a shaft extension projecting through the protective housing 27 for connection to the extension shaft 28 by means of a suitable coupling 29 and thence to the gear train within the gear box 71. The shutter assembly 31, described in greater detail below in relation to Figs. 3, 4 and 5 includes at least one block 32 threadably engaged with the elongated drive screw 33, which in turn is connected to the gear train within the gear box 71.

Referring next to Fig. 2, pinion 72, fixedly secured to the end of the extension shaft 28 of the sight drive mechanism which projects into the gear box 71, engages the idler gear 73 rotatably mounted in the gear box 71. Pinion 74 is connected to the end of the drive screw 33 of the shutter drive mechanism which projects into the gear box 71. The idler gear 73 and the pinion 74 both operatively engage the common drive gear 75 connected to and rotatable with the bevel gear 76 concentric therewith. The bevel gear 76 is engaged by bevel gear 77 mounted upon shaft 78 and rotated by crank 79, shown in Fig. 1. The idler gear 73 is required to provide for properly coordinated movement in opposite directions of the blocks 25 and 32 along similarly threaded drive screws 26 and 33, respectively. Such an arrangement accommodates the image reversal at the focal plane produced by the lens assembly 13.

Fig. 3 shows a preferred embodiment of the shutter assembly including the rectangular shutter mechanism supporting plate 34 with a rectangular opening 35 therethrough connected by means of internally threaded block 32 to the shutter drive screw 33 and provided with four roller elements 36 rotatably mounted at the four corners of plate 34 and projecting beyond the outer periphery of said plate for engagement with suitable guiding surfaces 63 within the camera body 11. In addition, Fig. 3 shows bevel gear 37 slidably mounted upon drive screw 33 and engaging bevel gear 38 rotatably mounted upon the supporting plate 34 and connected to the shutter blade drive gears through gear 51, shown in Fig. 4. The bevel gear 37 is positioned on drive screw 33 by a guide member 41 secured to plate 34 and spacers 42 and 43, one of which may be formed integrally with gear 37. The rotary motion of the drive screw 33 can conveniently be transmitted to the bevel gear 37 by means of key way 39 and a key, not shown, mounted within gear 37 and slidably engaged in key way 39. Fig. 3 also includes a showing of a slotted shutter blade 53 and a cooperating solid shutter blade 54.

The showing of the reverse side of the shutter assembly 31 in Fig. 4 includes a first pair of gears 51, 51' supporting the opposite ends of the shutter blade 53 having slit 55 therethrough by means of a pair of eccentrically disposed pivotal connections 57, 57' and a second pair of gears 52, 52' supporting the opposite ends of the solid shutter blade 54 by means of a pair of eccentrically disposed pivotal connections 58, 58'. It will be noted that the respective pairs of gears 51, 51' and 52, 52' are meshed so that the blade supporting pivotal connections 57, 57' and 58, 58' are 90 degrees out of phase. This phasing of the blades is very important in this type of mechanism wherein both sets of gears are driven by a common drive gear 38 to insure that one of the shutter blades is always driving the gears most remote from the drive gear 38 in the proper direction so that no dead center conditions are encountered. Thus, by means of the coordinated drive means including drive screw 33, internally threaded block 32, bevel gears 37 and 38, and gears 51, 51', and 52, 52', rotation of the drive screw 33 simultaneously produces rectilinear motion of the entire shutter assembly longitudinally of the drive screw and rotation in opposite directions of the respective shutter blades in such a manner that the slit 55 is periodically uncovered at predetermined equally spaced positions across the surface of the film 83.

Referring next to Fig. 5, this view shows a planar shutter cover 81 composed of flat sheet material and having a centrally disposed aperture therethrough comprising an elongated slit 82. The shutter cover 81 may conveniently be provided with a plurality of holes therethrough for receiving bolts for attaching the cover to suitable elongated shoulders or bosses 65 attached to and extending along the supporting plate 34 on the reverse side thereof, as shown in Fig. 4, to support the cover in a position in which it clears the shutter blades. The ends of curtains 61 may also be connected to bosses 65 by any suitable means. The cover, as illustrated in Fig. 5, also includes means for producing a time reference on the film comprising a timing mark light emanating from a minute aperture 84 adjacent one end of the slit through the cover. Due to critical space limitations created by the close proximity of the shutter assembly to the film 83, no known light source suitable for this purpose can be mounted between the cover and the film. Therefore, a timing lamp 84' is mounted in a light tight housing 85 on the reverse side of the cover 81, as shown in Fig. 6, in a position in which it does not interfere with the action of the shutter blades, and the light from the lamp is transmitted to the timing mark aperture 84 by means of a length of Lucite 86 wound around the lamp, extended through an opening in cover 81, and thence to a position beneath the aperture 84 in spring shield 87 through a closed channel 88. Timing lamp 84' is incorporated in a suitable timing circuit (not shown) by means of which it is illuminated at appropriate predetermined time intervals. With this arrangement the lamp periodically exposes a dot on one margin of the film to establish the time reference. The pin 89, engaging a slot in one end of shield 87, permits deflection of the shield as it engages the film 83.

In operation the camera assembly comprising the instant invention is fixedly mounted so that it faces at substantially right angles to the flight path of an object the trajectory of which is to be recorded by this camera. The crank 79 is operated manually to rotate the sight assembly 21 so that it tracks an object in flight. Since both the shutter assembly and the sight assembly are operated simultaneously by manual operation of the crank 79 through the gear train within the gear box 71, the shutter assembly 31 is drawn across the film plane within the camera as the sight assembly is rotated. In order to keep the sight in continuous synchronism with the exposure slit 82 as the shutter assembly traverses the focal plane, the sight assembly must be rotated at the same instantaneous angular rate as that of the image forming rays within the camera body, as these rays rotate about the lens nodal point. Hence, it is essential that the parts of the respective drive mechanisms be properly selected to maintain this critical relationship.

As an object in flight enters the area in which its trajectory can be recorded by the instant invention, the operator sights the object through the sight assembly and thereafter rotates the sight assembly by means of the crank 79 so that the object continues to be viewed through the sight assembly. Simultaneously, the shutter assembly is driven through the common gear train across the focal plane of the camera by means of the shutter assembly drive screw. During this translational movement of the shutter assembly, it is supported by the rollers 36 mounted thereon and engaging the tracks 63 fixedly secured within the camera body, and the gears supporting the respective shutter blades in the shutter mechanism are rotated by the gear train interconnecting these gears and the shutter assembly drive screw so that during each complete rotation of the respective shutter blades the slit in one blade is uncovered by the other blade while it is in line with the slit in the shutter cover so that a narrow vertical strip extending transversely of the film is exposed to record the instantaneous position and attitude of the object in flight. The gear ratio of the drive for the shutter blades is selected in relation to the pitch of the shutter assembly drive screw so that successive exposures are disposed immediately adjacent each other on the film. Meanwhile, the timing light is triggered at predetermined time intervals to record timing marks along the edge of the film to form a time reference for the flight of the object. Operation in this manner is continued until the shutter has traversed the full width of the camera to record a substantial number of vertical strip photographs, each recording the instantaneous position and attitude of the object in flight and together forming a composite photograph of the trajectory. Multiple exposures of various portions of the film are precluded by the combined effect of the shutter assembly which exposes only a narrow strip at a time as it traverses the film and the curtains attached to opposite edges of the shutter assembly and wound upon conventional spring biased rollers at opposite sides of the camera which are not shown since they are conventional installations not considered part of the instant invention.

The resulting photograph consists of a composite view of the area viewed by the camera obtained by sequentially exposing narrow vertical strips extending transversely of the film so that the object for which the trajectory is recorded by the instant invention is pictured in each strip exposed, with the result that the composite picture provides a trace of the trajectory which is graphic in nature, an accurate record of the instantaneous attitude of the object at the time of each exposure throughout the trajectory, and a time reference associated with the trace of the trajectory.

Thus, the present invention provides a trajectory recording camera which is relatively light and compact including a shutter mechanism capable of performance at very high speeds and capable of accommodating a large size film which produces a negative that is sufficiently large to provide clear definition of the target position throughout its trajectory and of the instantaneous attitude of the target at a large plurality of locations along its trajectory.

Various different types of drive mechanisms may be substituted for those illustrated as long as the critical relationships between the movement of the various parts, as noted above, are preserved. For example, the gear train within the gear box could be replaced by a suitable chain drive, and the shutter mechanism characterizing the instant invention could be used with other types of drive mechanisms than the drive screw illustrated. Moreover, this shutter mechanism may be incorporated in camera assemblies designed for performing other functions.

Obviously, many modifications and variations of the present invention are possible in the light of the above teachings. It is, therefore, to be understood that within the scope of the appended claims the invention may be practiced otherwise than as specifically described.

What is claimed is:

1. A shutter assembly for an aerial trajectory recording camera comprising a flat generally rectangular supporting plate with a central elongated opening therethrough mounted for translational movement across the focal plane of a camera, a first pair of intermeshed gear members rotatably mounted upon one end of said supporting plate, a second pair of intermeshed gear members rotatably mounted upon the other end of said supporting plate, a first elongated generally rectangular shutter blade pivotally connected at one end to one of said first pair of gear members and pivotally connected at the other end to one of said second pair of gear members, said first shutter blade having a narrow elongated slit therethrough extending lengthwise thereof, a second elongated generally rectangular shutter blade pivotally connected at one end to the other of said first pair of gear members and pivotally connected at the other end to the other of said second pair of gear members, a flat rectangular shutter cover having a narrow elongated slit therethrough extending lengthwise thereof superimposed over said shutter blades and secured to said supporting plate, and shutter blade drive means operable to produce simultaneous rotation of the gear members supporting the respective shutter blades in opposite directions.

2. A device as described in claim 1, in which the pivotal connections by means of which the respective shutter blades are connected to the respective gear members are disposed substantially 90 degrees out of phase in order to insure that no dead center conditions are encountered.

3. An aerial trajectory recording camera comprising a generally rectangular hollow camera body, a lens cone mounted upon one side of said body, a lens assembly attached to the apex of the lens cone, a demountably attached film magazine secured to the other side of said body, a sight assembly rotatably mounted upon said camera body, a shutter assembly movably mounted within said body for translational movement across the focal plane of the camera, a sight drive mechanism mounted upon the body and arranged to control pivotal movement of the sight assembly, a shutter drive mechanism mounted within said camera body and including coordinated drive means arranged to control the translational movement of the shutter assembly and to cyclically operate the shutter assembly concurrently at time intervals dependent upon the rate of translational movement of the shutter assembly, and a manually controlled operating means operatively connected to both the sight drive mechanism and the shutter drive mechanism to produce coordinated movement of the respective drive mechanisms, whereby successive strips of film within the camera are exposed by operation of the shutter assembly to record successive instantaneous positions of an airborne object along its trajectory, as the sight assembly is rotated by the operating means to follow the flight of the object and the shutter assembly simultaneously traverses the focal plane of the camera.

4. An aerial trajectory recording camera comprising a generally rectangular hollow camera body, a lens cone mounted upon one side of said body, a lens assembly attached to the apex of the lens cone, a demountably attached film magazine secured to the other side of said body, a sight assembly rotatably mounted upon said camera body, a shutter assembly movably mounted within said body for translational movement across the focal plane of the camera, a sight drive mechanism mounted upon the body and arranged to control pivotal movement of the sight assembly, a shutter drive mechanism mounted within said camera body and arranged to control the translational movement of the shutter assembly and to cyclically operate the shutter assembly simultaneously, and a manually controlled operating means operatively connected to both the sight drive mechanism and the shutter drive mechanism to produce coordinated movement of the respective drive mechanisms, whereby successive strips of film within the camera are exposed by operation of the shutter assembly to record successive instantaneous positions of an airborne object along its trajectory, as the sight assembly is rotated by the operating means to follow the flight of the object and the shutter assembly simultaneously traverses the focal plane of the camera, said shutter assembly comprising a generally rectangular supporting frame with a narrow elongated aperture therethrough extending lengthwise thereof, a first pair of meshed gear members rotatably mounted upon said supporting frame adjacent to one end of said aperture, a second set of intermeshed gear members rotatably mounted upon said supporting frame adjacent the other end of said aperture, a first elongated generally rectangular shutter blade pivotally connected at one end to one of said first pair of gear members and pivotally connected at the other end with one of said second pair of gear members, said first shutter blade having a narrow elongated slit therethrough extending lengthwise thereof so that it may be periodically superimposed upon the aperture in said supporting frame, a second elongated generally rectangular shutter blade pivotally connected at one end to the other of said first pair of gear members and pivotally connected at the other end to the other of said second pair of gear members, said second shutter blade being arranged to function as a capping shutter, and shutter blade drive means operably interconnecting said gear members and said shutter drive mechanism, whereby operation of the shutter blades is coordinated with operation of said shutter drive mechanism.

References Cited in the file of this patent

UNITED STATES PATENTS 2,460,163    Bowen   ---------------- Jan. 25, 1949